United States Patent
Büellesfeld et al.

(10) Patent No.: US 7,963,122 B2
(45) Date of Patent: Jun. 21, 2011

(54) MICROPRISM AND MICROROD LENSES, METHOD FOR THE PRODUCTION THEREOF

(75) Inventors: Frank Büellesfeld, Frankfurt (DE); Andreas Langsdorf, Ingelheim (DE); Ulrich Lange, Mainz (DE); Volker Plapper, Saulheim (DE)

(73) Assignee: Schott AG, Mainz (DE)

( * ) Notice: Subject to any disclaimer, the term of this patent is extended or adjusted under 35 U.S.C. 154(b) by 1036 days.

(21) Appl. No.: 11/219,187

(22) Filed: Sep. 2, 2005

(65) Prior Publication Data
US 2006/0059950 A1    Mar. 23, 2006

(30) Foreign Application Priority Data
Sep. 3, 2004   (DE) .......... 10 2004 043 206

(51) Int. Cl.
   *C09B 37/025*  (2006.01)
(52) U.S. Cl. .......... 65/85; 65/403; 65/435; 65/437
(58) Field of Classification Search .......... 65/85, 403, 65/498, 499, 435, 437, 402
   See application file for complete search history.

(56) References Cited

U.S. PATENT DOCUMENTS

| | | | | | |
|---|---|---|---|---|---|
| 3,538,722 | A | * | 11/1970 | Stream | 65/438 |
| 4,514,205 | A | * | 4/1985 | Darcangelo et al. | 65/491 |
| 6,010,741 | A | * | 1/2000 | Rosenkranz et al. | 427/9 |
| 6,715,317 | B1 | * | 4/2004 | Brauer et al. | 65/29.14 |
| 2002/0014092 | A1 | | 2/2002 | Morishita et al. | 65/63 |
| 2002/0088253 | A1 | * | 7/2002 | Roba et al. | 65/481 |
| 2003/0021036 | A1 | | 1/2003 | Kusuyama | |
| 2003/0106342 | A1 | * | 6/2003 | Nishimura | 65/498 |
| 2005/0223751 | A1 | * | 10/2005 | Janka et al. | 65/435 |

FOREIGN PATENT DOCUMENTS

| | | |
|---|---|---|
| DE | 19536960 | 3/1996 |
| DE | 19629169 | 3/1997 |
| EP | 0819655 | 1/1998 |

OTHER PUBLICATIONS

Preliminary Exam Report dated Sep. 15, 2010 corresponding to French Patent Application No. 0509002.

* cited by examiner

*Primary Examiner* — Queenie Dehghan
(74) *Attorney, Agent, or Firm* — Ohlandt, Greeley, Ruggiero & Perle, LLP

(57) ABSTRACT

The invention relates to a method and an apparatus for producing optical glass elements, in particular optical prisms or optical rod lenses, using a drawing process. The geometry of the glass strand which is to be produced is controlled by means of cooling or heating elements positioned at least around portions of the periphery or longitudinal axis of the glass strand, inside or outside the heating apparatus.

21 Claims, 5 Drawing Sheets

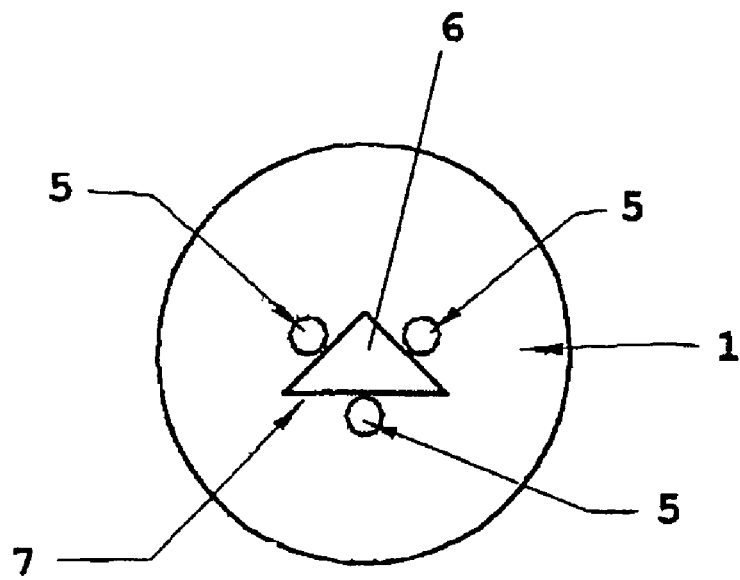
Fig. 2.a
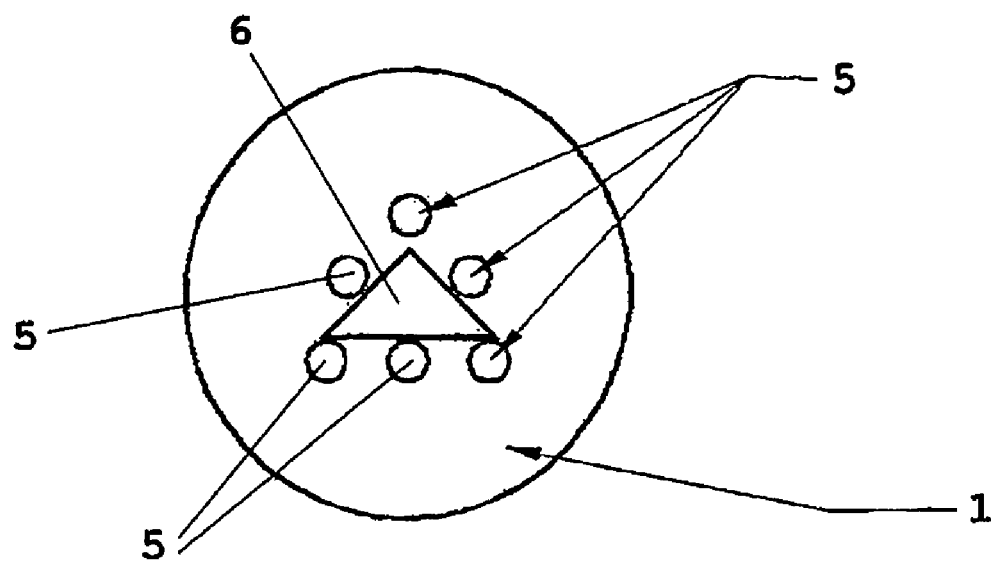
Fig. 2.b

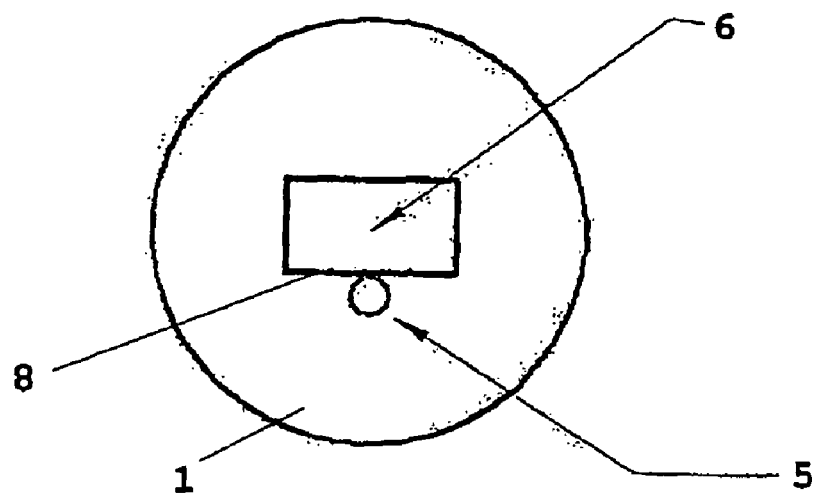
Fig. 3.a
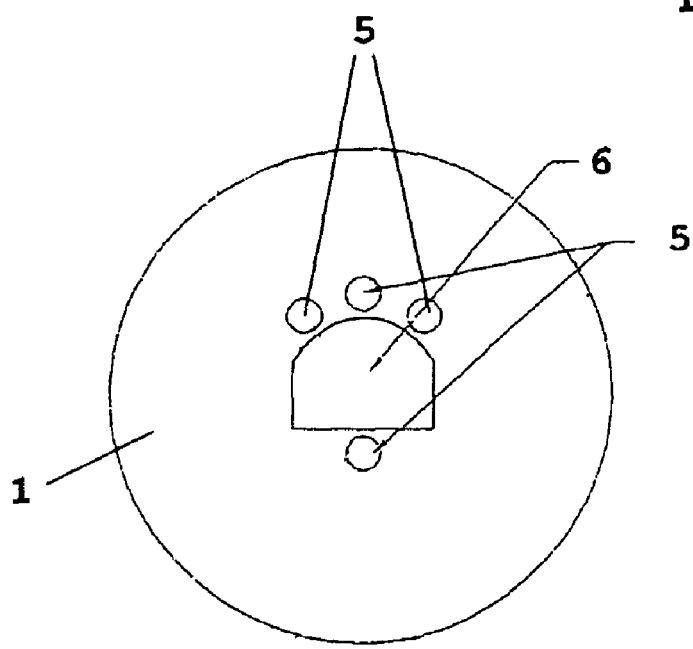
Fig. 3.b

MICROPRISM AND MICROROD LENSES, METHOD FOR THE PRODUCTION THEREOF

CROSS-REFERENCE TO RELATED APPLICATIONS

This application claims the benefit under 35 U.S.C. §119(a) of German Application No. 10 2004 043 206.6-45, filed Sep. 3, 2004, the entire contents of which are incorporated by reference herein.

BACKGROUND OF THE INVENTION

1. Field of the Invention

The invention relates to a method and an apparatus for producing optical glass elements, in particular optical prisms or optical rod lenses, using a drawing process.

2. Description of Related Art

Optical glass elements, such as for example prisms or lenses, can be obtained from a block of optical glass by cutting, grinding and then polishing. However, this represents a time-consuming and expensive process.

Additional problems arise if optical glass elements with a small cross section or small dimensions are being produced, since they are much more difficult to handle and sufficient accuracy of the edge sharpness, edge angle, flatness of the surfaces and a low roughness of the surfaces, which are crucial factors in determining the quality of an optical glass element, are only possible with considerable work and therefore also at high cost.

However, miniaturized optical glass elements, in particular microlenses and/or microprisms, are becoming increasingly important in photography, in particular digital photography in cell phones, and need to be inexpensive to mass produce. Further application areas for microprisms are beam splitters in optical pick-up systems. Cylindrical microlenses are also employed in the beam shaping of diode lasers as "fast axis collimator lenses (FACs)".

One known method for producing optical glass elements with a small cross section is to use a drawing process. In this case, a generally continuous glass strand of a selected preform or a selected cross section is fed to a heating apparatus. The glass is heated until it is plastically deformable. A drawing apparatus draws the glass strand out of the heating apparatus, so as to form a draw bulb. The drawing operation reduces the cross section of the glass strand in a targeted way and then the glass strand is severed from the drawn glass strand, for example by cutting, to form a glass element of the desired size or length.

The main objective in this context is to reduce the glass strand to a desired cross section and to transfer the geometry of the preform to the end product or the final shape of the glass element to be produced as far as possible without changing this basic geometry. Significant parameters in this method include the rate at which the glass strand is fed into the heating apparatus, the size of the heating apparatus, the temperature selected in the heating apparatus to achieve an optimum viscosity of the glass strand and the draw rate of the glass strand out of the heating apparatus.

Although the drawing process transfers the basic geometry or contour of the preform to the glass element that is to be produced, deformation does occur, for example along the cross section of a glass strand a concave side face is formed from an originally planar side face, and consequently under certain circumstances the final shape of the glass element that is to be formed may differ significantly from the preform. This requires a further working step to correct this deformation by means of grinding and then polishing, which is highly complex in the case of the present optical components of small cross section, for the reasons mentioned above.

Conventional measures for minimizing these changes include, inter alia, the selection of a preform which corresponds to the desired final shape as accurately as possible, the selection of a deformation viscosity which is as high as possible, to ensure uniform heating of the glass strand the selection of a temperature which is constant over the course of time in the heating apparatus, the selection of a temperature which is as uniform as possible over the periphery of the glass strand, i.e. ideally a temperature distribution which is axially symmetrical along the longitudinal axis, and the introduction or positioning of the glass strand in the heating apparatus in such a manner that the glass strand is guided in the center of the heating apparatus and that the longitudinal axis of the glass strand lies as accurately as possible on the longitudinal axis of the heating apparatus and therefore on the axis of symmetry of the temperature field.

To improve the flatness and smoothness of the surfaces while at the same time ensuring similarity of the cross section of a drawn optical glass element with its parent glass, US 2002/0014092 A1 describes a method involving providing a parent glass which has a cross section that is substantially almost identical to the desired cross section of the optical glass element that is to be produced. This document does not give any indication that the cross section of the parent glass deliberately takes a different shape than the optical glass element to be produced. Moreover, in the case of a complex optical element, for example a polygonal prism, the provision or production of a parent glass which is substantially almost identical to the desired cross section of the optical glass element to be produced can entail considerable outlay in terms of labor, time and therefore costs. If the surface quality desired is high, moreover, a final polish may be required.

EP 0819655 B1 attributes the deviations from the tube geometry in the known methods to disruption to the homogenous temperature field, for example caused by measurement apparatuses in the furnace region or misalignments of the tube longitudinal axis with respect to the axis of symmetry of the temperature field. To remedy this problem, the document describes a method which locally heats or cools the softened glass material in at least one deformation section extending over only part of the periphery of the deformation region as a function of a recorded deviation in the cross-sectional geometry from a desired geometry of the component. The cooling is in this case effected by directing a gas flow onto the glass material. The method serves to eliminate ovality in components with a circular or annular cross section. The gas flow directed onto the surface of the glass material may, however, have adverse effects on the surface quality and therefore the optical properties of optical glass elements. In particular, this can lead to impurities and stresses in the regions close to the surface, which disrupt the beam path. Moreover, it can result in rounding of the edges of glass strands which are polygonal in cross section.

With an optimum axially symmetrical temperature distribution and optimum positioning of the glass strand in the heating apparatus, deformation of glass strands can be avoided only in the case of glass strands which are axially symmetrical in cross section, but not in the case of glass strands which are not axially symmetrical in cross section. The glass particles of a glass strand of any desired cross-sectional or preform geometry also have to move from the outside inward, perpendicular to the drawing direction, on their path through the draw bulb. In the case of a cross section which is not axially symmetrical, not all these flow paths have the same flow resistance. Therefore, in this case of a cross section which is not axially symmetrical, the reduced cross section which results from the acceleration in the drawing direction and the conservation of mass is not identical, or under certain circumstances even not similar, to the original preform geometry even with a homogenous temperature distribution and negligible surface tension effects.

BRIEF SUMMARY OF THE INVENTION

Therefore, in view of this background, the present invention is based on the object of providing a method and an apparatus for producing—in particular optical—glass elements, in particular for producing optical prisms or optical lenses, using a drawing process, which avoid the abovementioned drawbacks of the prior art.

In particular, the method and the apparatus are to be suitable for the production of optical glass elements with a small cross section.

This encompasses in particular the objective of minimizing the deformation which disadvantageously occurs during the drawing process, and under certain circumstances even of eliminating this deformation altogether, while at the same time preserving the surface quality, in particular the surface quality of an optical glass element. This involves maintaining the edge sharpness, edge angle, flatness of the surfaces and low roughness.

This encompasses minimizing or eliminating the formation of a concave side face from an originally planar side face which occurs along the cross section of a glass strand during the drawing process and the preservation of the accuracy of edge sharpness, edge angle, flatness and low roughness of the surfaces of a—in particular optical—glass element. The present invention is intended to avoid the need for a further operation, such as for example a treatment to improve the surface quality by grinding and/or polishing following the drawing operation.

Accordingly, the method and the apparatus for carrying it out should be economically viable and inexpensive to employ.

This encompasses the objective of avoiding the use of preform or heating muffle geometries which are complex and therefore labor-intensive, time consuming and expensive and of avoiding the need for such accurate alignment of the apparatus, in particular precise introduction of the glass strand into the center of the heating apparatus, that it can only be achieved with considerable outlay.

Moreover, the method according to the invention and the apparatus for carrying it out are intended to allow the use of preform geometries which are simple to produce and are to be suitable for use in conventional heating apparatuses or types of heating muffle.

Furthermore, the method and the apparatus for carrying it out are to be flexible in use, i.e. suitable for use for different geometries of in particular optical glass elements or for different cross-sectional geometries of a glass strand.

Furthermore, the disadvantageous deformation which occurs during the drawing process should not only be minimized or avoided, but moreover the invention has the object of actually providing a design activity. This in particular involves allowing active and flexible designing of the cross-sectional geometries of a drawn glass strand and therefore active and flexible designing of glass elements or glass element geometries.

Since a glass element which has a complex geometry can only be achieved by means of a preform geometry which is correspondingly expensive to produce, by contrast the present invention is intended to allow glass elements with a complex cross section to be produced from preform geometries which are simple and inexpensive to produce.

This object is achieved in a surprisingly simple way just by the method for producing—in particular optical—glass elements and the apparatus for carrying out the abovementioned method.

In this context, the invention does not attempt to avoid the factors which cause the deformation, but rather to provide influencing options and/or to allow simple variation of additional process parameters in order to counteract the tendency of a glass strand to be deformed during the drawing process by compensating for this tendency.

In a first embodiment, the invention comprises a method for producing—in particular optical—glass elements, in particular for producing optical prisms or optical lenses, using a drawing process. This method comprises the steps of providing a glass strand of a selected preform, feeding the glass strand into a heating apparatus, softening the glass strand in the heating apparatus and drawing the glass strand through a drawing apparatus. In the method, the geometry of the glass strand that is to be produced is controlled by means of cooling or heating elements positioned at least around portions of the periphery or the longitudinal axis of the glass strand, inside and/or outside the heating apparatus.

The glass elements in this case comprise glass elements of any desired geometry, in particular polygonal prisms, lenses, rod lenses and glass elements with convex, concave, spherical or aspherical, for example elliptical, cylindrical or parabolic, surfaces. The glass elements mentioned here are to be understood as examples without in any way restricting the invention to the selection mentioned.

The inventors have discovered that the disadvantageous deformation to the side faces which occurs during the drawing process, in particular the formation of a concave side face from an originally planar side face which disadvantageously occurs along the cross section of a glass strand during the drawing process, is avoided by the arrangement according to the invention of cooling or heating elements positioned around at least portions of the periphery or the longitudinal axis of the glass strand, inside or outside of the heating apparatus. The result is active control of the cross-sectional geometry of the drawn glass strand.

In this context, it is not necessarily imperative always to use a plurality of cooling or heating elements. According to the invention, it is also possible for just one cooling or heating element to be positioned around the periphery or the longitudinal axis of the glass strand, inside or outside the heating apparatus. Furthermore, it is possible to use one cooling element or a plurality of cooling elements simultaneously with one heating element or with a plurality of heating elements.

The term cooling or heating element is to be understood as meaning an element which has a warm or cold surface. In this context, a cooling element is not to be understood as encompassing a gas flow directed onto the surface of a glass strand.

Control by means of cooling or heating elements positioned outside the heating apparatus and therefore outside the deformation region allows precooling or preheating over the periphery or the longitudinal axis of the glass strand or prevents or boosts more rapid cooling after drawing out of the heating apparatus.

It is therefore possible not only to avoid the deformation which disadvantageously occurs during the drawing process by compensating for it, but also the present invention makes it possible to provide active design. The arrangement of the cooling or heating elements according to the invention and the generation of a targeted temperature distribution in accordance with the invention make it possible to actively influence and control the side face or the geometry of the glass strand, in particular over its cross section but also over its longitudinal extent. This allows active or dynamic and flexible designing of the cross sectional geometries of a drawn glass strand substantially independently of the cross-sectional shape of the preform.

This involves at least one side face which is substantially concave when a glass strand is seen in cross section being converted into a substantially planar side face or into a substantially convex side face. Furthermore, the method according to the invention allows a side face which is substantially planar at least when a glass strand is seen in cross section to be converted into a substantially concave side face or into a substantially convex side face or also allows a side face which is substantially convex at least when a glass strand is seen in cross section to be converted into a substantially planar side face or into a substantially concave side face.

In one particular embodiment of the method, at least one side face which is substantially spherical when a glass strand is seen in cross section is converted into a substantially aspherical side face, or at least one side face which is substantially aspherical when a glass strand is seen in cross section is converted into a substantially spherical side face.

In this context, it is not imperative that the method according to the invention be used to produce a significant change in shape, for example a change from a concave side face into a convex side face. It is also within the scope of the invention to change individual variables of a function which describes the surface of a body, in this case a glass element, without bringing about a significant change in shape, such as for example to change the radius of a surface of a segment of a sphere.

It is therefore possible to form or shape a desired glass element which has a complex geometry, for example a polygonal prism, using a preform geometry which is correspondingly simple and therefore inexpensive to produce, for example a circular shape.

Accordingly, in a further embodiment of the method, the cross section of the preform of the glass strand is provided in a shape which differs from the cross section of the final shape. Under circumstances, however, it may also be expedient for the cross section of the preform of the glass strand to be provided in a shape that is identical to the cross section of the final shape.

In one particular embodiment, the preform may also be defined in such a manner that the preform deviates from the cross section of the final shape and that the cross section of the final shape of the glass strand has the desired cross section. This compensates for the deformation which occurs during the drawing process by suitable selection of a defined preform geometry which deviates from the final shape and is distinguished by the fact that the deformation which occurs during the drawing operation deforms the geometry in such a manner that the geometry of the final shape corresponds to the desired geometry.

One particularly advantageous feature of the present invention is that the cooling or heating elements are not in physical contact with the glass strand or do not come into physical contact with the glass strand. This in particular prevents the formation of disruptive impurities and stresses in the regions close to the surface, which can lead to significant interference with the beam profile. Moreover, it is in this way possible to avoid the possibility of rounding of the edges in the case of, for example, glass strands which are polygonal in cross section caused by a gas flow directed directly onto the surface of the glass element for cooling purposes.

Rather, in addition to control of the geometry of a side face, it is also possible to control the edge sharpness, i.e. the precision of the contours and the precision of the angles formed by the edges, by means of the arrangement of cooling or heating elements according to the invention.

The temperature distribution can be controlled online during the drawing operation. In this case, the geometry and dimensions of the drawn glass strand are determined, for example by optical scanning of the drawn glass strand within the heating apparatus or after drawing outside the heating apparatus. In the event of deviations from a desired geometry or desired dimension of the glass strand cross section that is to be produced, the temperature distribution or temperature profile can be controlled accordingly, by means of cooling or heating elements positioned around portions of the periphery or longitudinal axis of the glass strand, inside or outside the heating apparatus.

The desired temperature profile can be controlled, inter alia, by the introduction, arrangement or positioning of the cooling or heating elements or by their cooling or heating power.

In this case, the cooling or heating elements are introduced completely or partially into the heating apparatus from the side on which glass is supplied or from the side on which is glass is drawn out. If the cooling or heating elements are only introduced partially, they are introduced into the heating apparatus to an extent of from 10% to 95%, particularly preferably from 65% to 85%, with respect to the height of the heating apparatus.

The arrangement of the cooling or heating elements is dependent on the selected preform of the glass strand, and it is particularly preferable for the cooling or heating elements to be arranged along at least one side face or along at least one corner of the glass strand. The cooling or heating elements are arranged parallel or inclined with respect to the longitudinal axis of the glass strand.

The cooling or heating elements may also take a bent or curved shape, in order to generate a temperature profile or temperature distribution which is optimally matched to the glass strand cross section that is to be produced from the preform.

The cooling or heating elements are positioned at a distance of from 0 cm to 50 cm, preferably from 0.01 cm to 10 cm and particularly preferably from 0.1 cm to 5 cm from a surface of the glass strand fed to the heating apparatus or a surface of the glass strand in the heating apparatus or a surface of the drawn glass strand.

In a particularly advantageous embodiment, the cooling or heating elements are introduced, arranged or positioned as a unit or independently of one another and furthermore their heating or cooling action can also be controlled separately or as a unit.

This separate introduction, arrangement, positioning or control allows the generation of a large number of different temperature distributions and can be flexibly matched to different preform geometries and final geometries that are to be produced in the glass strand.

The arrangement of cooling or heating elements according to the invention generates a temperature profile about the periphery of a glass strand or the longitudinal axis of a glass strand. The temperature in this case has a difference of from $0°$ C. to $100°$ C., preferably from $1°$ to $30°$ C. and particularly preferably from $1°$ C. to $10°$ C., over the periphery of the glass strand or the longitudinal axis of the glass strand.

Furthermore, the cooling or heating elements according to the invention can be used in conventional heating devices. Moreover, the positioning of the glass strand in the heating apparatus is not critical, since disruptions which occur in the temperature distribution can be actively compensated for by cooling or heating elements according to the invention.

The cooling or heating elements do not all have to have the same geometry or dimensions, but rather can be matched to the temperature distribution that is to be generated.

In one particular embodiment, the cooling or heating elements are provided as substantially solid bodies or as hollow bodies, in particular as a tube.

The hollow body is provided in a diameter of from 0.1 cm to 30 cm, preferably from 0.1 cm to 10 cm and particularly preferably from 0.5 cm to 3 cm, and in a length of from 0.5 cm to 100 cm, preferably from 1 cm to 75 cm and particularly preferably from 5 cm to 50 cm.

According to the invention, the hollow bodies do not all have to have the same geometry or the same dimensions, but rather they can be matched to the temperature distribution which is to be generated, the dimensions and geometry of the glass strand and to the dimensions, geometry and temperature field of the heating apparatus.

Depending on the temperature which is to be set, a fluid, in particular air, is passed through the hollow body. The fluid can in this case be introduced at ambient temperature, or in cooled or heated form.

The temperature is controlled by means of the flow rate of the fluid within the hollow body. In this case, the fluid is passed through the hollow body at a flow rate of from 0.01 l/min to 1000 l/min, preferably from 0.1 l/min to 200 l/min and particularly preferably from 1 l/min to 50 l/min, it being possible for the flow rate of the fluid in the individual cooling or heating elements to be set uniformly or independently or separately from one another.

In this case, the cooling or heating element may be designed as a tube which is open on one side, in which a second tube of smaller cross section, which is open on two sides, is arranged over the opening, in particular coaxially, in such a manner that a first opening of the second tube is located in the interior of the first tube. The fluid, in this case air, flows into the second tube at a defined flow rate via the second opening in the second tube, flows out of the first opening and as a result into the first tube and then back out of the opening in the first tube. Possible materials for forming the tube include materials which have a sufficient heat resistance to the temperatures which are present in the heating apparatus.

The introduction of the fluid cools or heats the hollow bodies to a temperature difference of from 0° C. to 2500° C., preferably from 10° C. to 1000° C. and particularly preferably from 10° C. to 500° C., with respect to the heating muffle.

The following method or process parameters are set depending on the cross section of the optical glass element that is to be shaped. The cross section of the glass strand fed to the heating apparatus is in this case provided in a cross-sectional area of from approximately 0.25 cm$^2$ to 2500 cm$^2$, preferably from 1 cm$^2$ to 100 cm$^2$, and particularly preferably from 3 cm$^2$ to 36 cm$^2$, which is then reduced by a factor of ½ to 1/100000, preferably from 1/20 to 1/30000 and particularly preferably from 1/100 to 1/10000, by the drawing of the glass strand.

In particular optical glasses from the BK, SF, LASF, LAF, BASF, BAF, K, PK, PSK, FK, SK, LAK, SSK, BALF, LLF, LF, F, LAK range, as well as technical glasses, such as B270, borosilicate glass, are used in the present invention. The glasses listed are to be understood as examples and in no way constitute a restriction to the list mentioned.

Important parameters in a drawing method include the rate at which the glass strand is fed into the heating apparatus, the size of the heating apparatus, the temperature selected in the heating apparatus to achieve an optimum viscosity of the glass strand and the rate at which the glass strand is drawn out of the heating apparatus.

To ensure a sufficient viscosity for drawing of the glass and to prevent the glass from breaking if the viscosity is too high and being excessively deformed if the viscosity is too low during drawing, the glass is softened to a viscosity of from $10^4$ dPas to $10^{12}$ dPas, preferably from $10^5$ dPas to $10^9$ dPas in the heating apparatus.

To achieve the corresponding viscosity of the glass in the heating apparatus, the heating apparatus, generally designed as a heating muffle, is at a temperature of from approximately 100° C. to 1500° C., preferably from 500° C. to 900° C.

In one particular embodiment, a defined size ratio of heating apparatus to preform is advantageously preferred in the production of glass elements, in particular in the production of prisms. In this case, the ratio of diameter of the heating apparatus to the dimensions of a glass element, in particular the side or leg length of a prism, is selected to be from 1.5 to 10 and preferably from 2 to 4.

It is possible to use conventional heating muffles with an axially symmetrical temperature field. In this case, no particular demands are imposed on the heating apparatus and its temperature distribution.

In one particular embodiment, the geometry of the heating apparatus is selected in such a way as to assist the shaping process during the drawing of the glass strand by forming a targeted temperature distribution. This can be a stand-alone measure or can be combined with the cooling or heating elements according to the invention.

The glass is in this case fed to the heating apparatus at a rate of from approximately 1 mm/min to 100 mm/min and preferably from approximately 3 mm/min to 15 mm/min, and is drawn out at a rate of from approximately 100 mm/min to 30000 mm/min, preferably from approximately 150 mm/min to 5000 mm/min.

The drawn glass strand is finally separated from the drawn glass strand, for example by cutting, to produce a glass element of the desired size or length. The cut line may in this case be parallel to the cross section of the glass strand or at any desired angle between 0° and 90°.

The method according to the invention obviates the need for a further operation, such as for example a treatment to improve the surface quality by grinding, polishing and/or coating which follows the drawing operation, although such a treatment may still take place in order to achieve an excellent surface quality.

Further possible embodiments of cooling or heating elements include the use of electrical heating elements, thermal barrier heat shields or direct surface heating by means of a laser or a flame.

Furthermore, the present invention comprises an apparatus, in particular for carrying out the method according to the invention, for producing—in particular optical—glass elements, in particular for producing optical prisms or optical lenses, from a glass strand of a selected preform using a drawing process. Said apparatus in this case comprises a feed apparatus, a heating apparatus, a drawing apparatus and is distinguished by the fact that cooling or heating elements are positioned at least around portions of the periphery or at least over portions of the length of the glass strand, inside or outside the heating apparatus.

In an advantageous embodiment of the invention, the cooling or heating elements are not in physical contact with the glass strand.

The cooling or heating elements are introduced completely or partially into the heating apparatus from the side on which glass is supplied or from the side on which glass is drawn out, and are arranged along at least one side face or along at least one corner of the glass strand. In this case, the cooling or heating elements may be arranged parallel or inclined with respect to the longitudinal axis of the glass strand.

The cooling or heating elements are positioned at a distance of from 0 cm to 50 cm, preferably from 0.01 cm to 10 cm and particularly preferably from 0.1 cm to 3 cm, from a surface of the glass strand which is fed to the heating apparatus or a surface of the glass strand in the heating apparatus or a surface of the drawn glass strand.

In this case, the cooling or heating elements are introduced, arranged, positioned or controlled in terms of their heating or cooling power as a unit or independently of one another. The cooling or heating elements are designed as substantially solid bodies or hollow bodies, in particular a tube, which may also be closed on one side. The hollow body according to the invention has a diameter of from 0.1 cm to 30 cm, preferably from 0.1 cm to 10 cm and particularly preferably from 0.5 cm to 3 cm, and has a length of from 0.5 cm to 100 cm, preferably from 1 cm to 75 cm and particularly preferably from 5 cm to 50 cm.

A fluid, in particular air, flows through the hollow body at a flow rate of from 0.01 l/min to 1000 l/min, preferably from 0.1 l/min to 200 l/min and particularly preferably from 0.1 l/min to 50 l/min. The flow rate of the fluid in each cooling or heating element can be controlled uniformly or independently of one another.

The introduction of the fluid causes the hollow bodies to have a temperature difference of from 0° C. to 2500° C., preferably from 10° C. to 1000° C. and particularly preferably from 10° C. to 500° C., with respect to the heating muffle.

Furthermore, the invention comprises a glass element, in particular an optical glass element, such as for example optical prisms, lenses or rod lenses, which can be produced by the process according to the invention.

This glass element is distinguished by the fact that at least one of its surfaces has a flatness of less than 10 μm, preferably of less than 1 μm and particularly preferably of less than 0.1 μm. The term flatness is to be understood as meaning the maximum difference in height of a surface or a side face within a straight portion. In particular, in the case of spherical surfaces, the maximum height difference is to be understood as being with respect to the arc radius which defines these surfaces.

The present invention is described in detail below on the basis of exemplary embodiments, in which the features of the different exemplary embodiments can be combined with one another. In this respect, reference is made to the appended drawings. In the individual drawings, identical reference designations refer to the same parts.

The invention is to be explained below on the basis of the following exemplary embodiments.

BRIEF DESCRIPTION OF THE SEVERAL VIEWS OF THE DRAWINGS

FIG. 2a shows, by way of example, a cross section or a sectional illustration through the apparatus shown in FIG. 1 on section line S1.

FIG. 2b shows, by way of example, a further embodiment of the apparatus shown in FIG. 1 on section line S1.

FIG. 3a shows, by way of example, a further embodiment of the apparatus shown in FIG. 1 on section line S1.

FIG. 3b shows, by way of example, a further embodiment of the apparatus shown in FIG. 1 on section line S1.

DETAILED DESCRIPTION OF THE INVENTION

Figure 1:
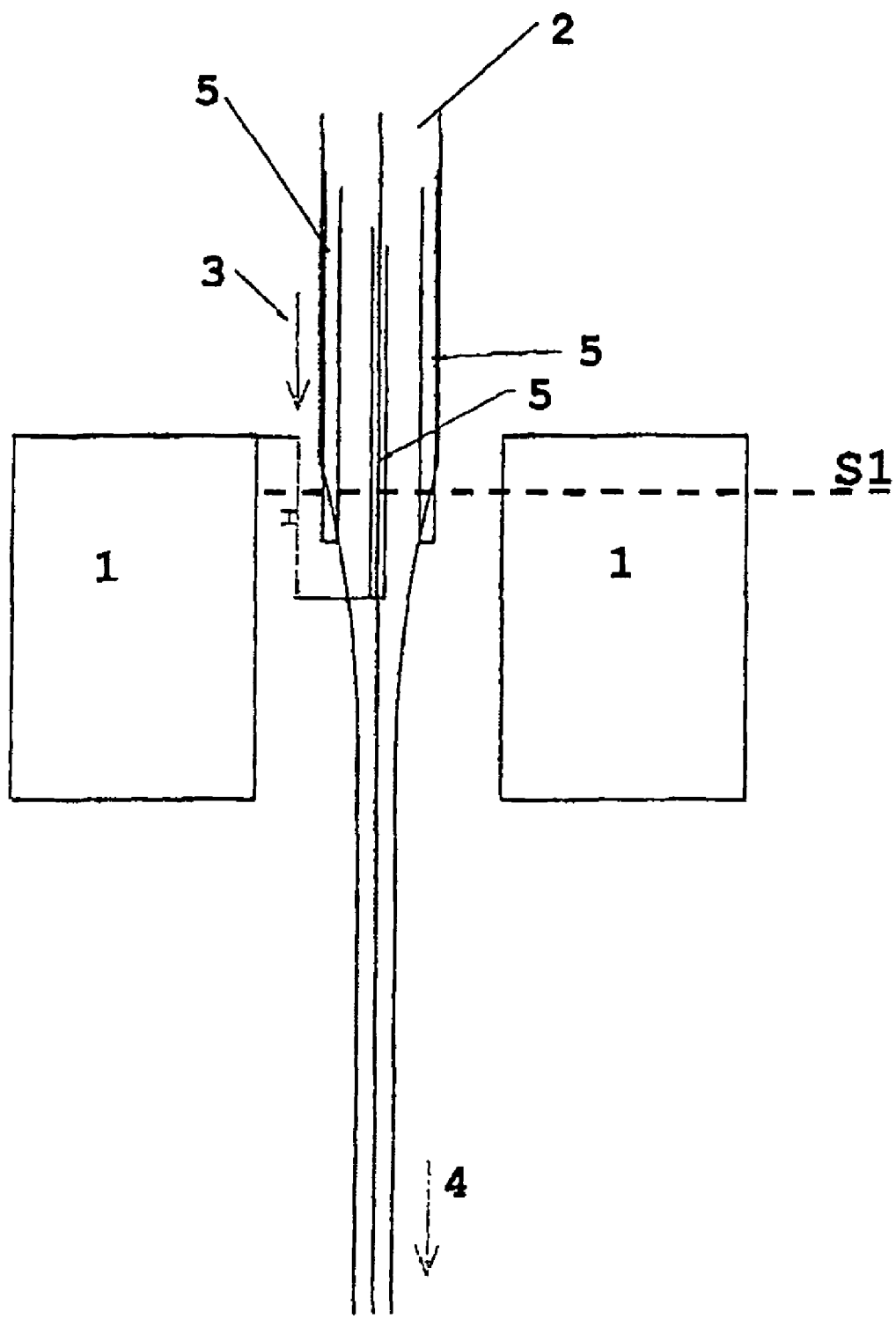
FIG. 1 shows, by way of example, a diagrammatic illustration of a heating apparatus along its longitudinal axis.

FIG. 1 shows, by way of example, a diagrammatic illustration along the longitudinal axis of a heating apparatus (1), in this case designed as a heating muffle, together with the glass strand (2) which is fed (3) to the heating apparatus (1) and drawn (4) out of it, so as to form a draw bulb, together with an exemplary embodiment of the arrangement of the cooling or heating elements (5) according to the invention. The heating muffle illustrated generates an axially symmetrical temperature field along its longitudinal axis, and the glass strand (2) illustrated is fed to the heating muffle in particular as a continuous glass strand (2) of a selected preform (6). In the present case, the cooling elements (5) comprise tubes through which air flows, known as cooling fingers, with a diameter of 0.6 cm and a length of 25 cm, which are arranged over the periphery of the glass strand (2) and have been or can be introduced different distances into the heating apparatus (1).

FIG. 2a shows a central cross section or a sectional illustration through the apparatus shown in FIG. 1 on section line S1 with an embodiment of the arrangement of cooling or heating elements (5) according to the invention along the side faces of the glass strand (2), which has the cross section (6) of a three-sided prism.

FIG. 2b likewise shows a sectional illustration through the apparatus shown in FIG. 1 on section line S1 in the form of a further embodiment. The cooling or heating elements (5) according to the invention are arranged along the side faces and along the corners of the glass strand (2), which has the cross section (6) of a three-sided prism.

FIG. 3a shows, by way of example, a sectional illustration through the apparatus shown in FIG. 1 on section line S1 with a further embodiment of the arrangement of a cooling or heating element (5) according to the invention along one side face (8) of the glass strand (2), which has the cross section (6) of a rectangular prism.

FIG. 3b shows, by way of example, the illustration of a further embodiment of the apparatus according to the invention on section line S1 through a glass strand (2) which has the cross section (6) of a rod lens, and of the cooling elements (5) according to the invention arranged on the spherical surface and on a flat surface of the rod lens.

Figure 4:
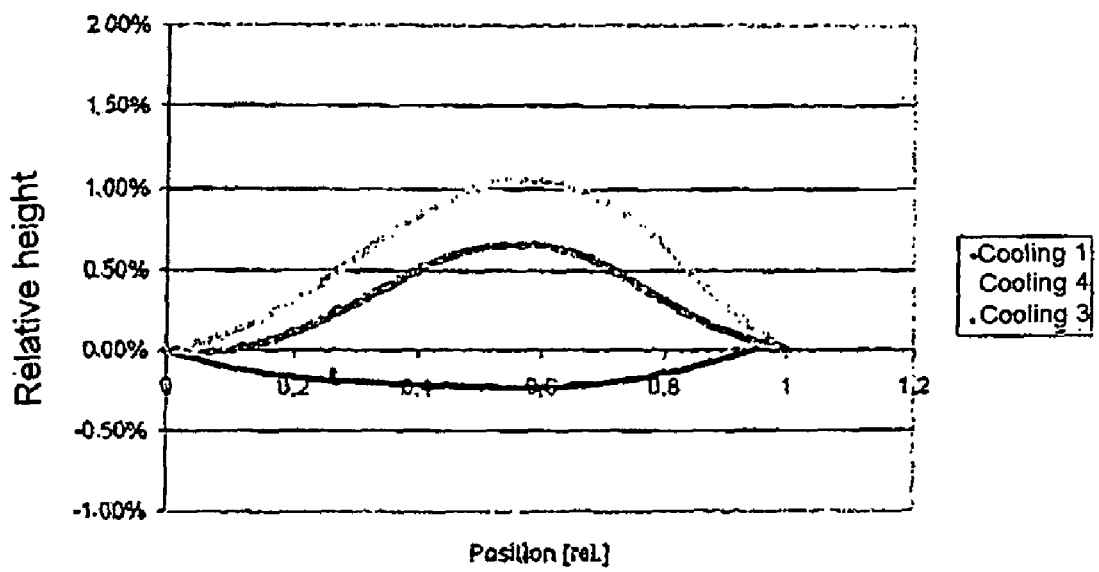
FIG. 4 shows, by way of example, the relative side face contraction as a function of the relative position on a side face for different degrees of cooling.

FIG. 4 shows, by way of example, the relative side face contraction of the side face (7) shown in FIG. 2a as a function of the relative position of a cooling element (5) on or at the side face (7) for different levels of cooling. The glass strand (2) consists of B270, has the cross section (6) of an equilateral prism, was drawn freely direct from the tank furnace with a side length of approximately 4 cm and already has an average contraction of −0.9%. The relative side contractions are determined from the quotient of the contraction and the edge length and the relative position is determined from the quotient of the position along the edge and the edge length. The cooling element (5) has in this case been introduced into the heating muffle (2), which generates a rotationally symmetrical temperature field and has been set to a temperature of 810° C., to a length of approximately 80% and is positioned at a distance of approximately 0.5 cm in the vicinity of the center of the side face. The cooling increases from cooling 1, 3 to 4. The temperature in the cooling element (5) is respectively 655° C. and 477° C. In the case of cooling 4, a temperature of 477° C. is set and in addition the cooling element is lowered by 15%. The increasing cooling first of all minimizes the concave contraction caused by the drawing operation. A convex shape is formed with more intensive cooling. Consequently, the concave sinking of a side face during drawing can be actively compensated for by the cooling element according to the invention. Furthermore, with the cooling element (5) according to the invention it is even possible to provide design effects and to convert a side face of concave geometry into a side face which is convex in shape.

Figure 5:
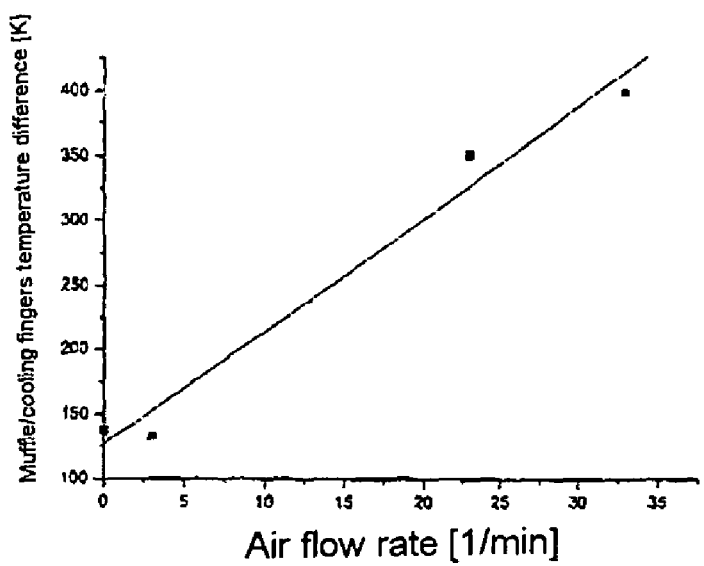
FIG. 5 shows, by way of example, the temperature difference between heating muffle and cooling element as a function of the air flow through a cooling element.

FIG. 5 shows, by way of example, the temperature difference between heating muffle (1) and cooling element (5) as a function of the flow of air through a cooling element (5). As the flow of air through the cooling element (5) increases, the cooling element is cooled to a greater extent, which given a constant heating muffle temperature (in this case approximately 810° C.) leads to an increase in temperature difference. The rise in the temperature difference as a function of the flow rate is in this case substantially linear. The straight line illustrates a fit to the data determined experimentally, which are represented by symbols.

Figure 6:
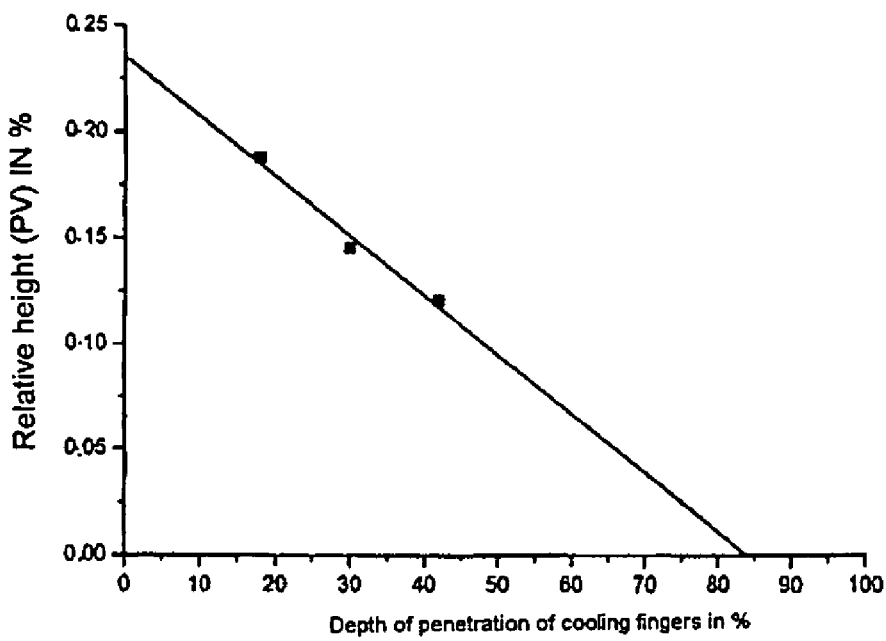
FIG. 6 shows, by way of example, the warp as a function of the relative penetration depth of a cooling element into the heating apparatus or the heating muffle.

FIG. 6 shows, by way of example, the relative height as a function of the relative depth of penetration of a cooling element (5) into the heating apparatus (2) given a constant flow of coolant of 3 l/min through the cooling element (5) for a rectangular-ground prism (as shown in FIG. 3a) made from N-BK7 with a cross-sectional area of (3 cm*3 cm)/2. The cooling element (5) is in this case positioned in the vicinity of the center of the side face (8), at a distance of approximately 0.1 cm. The relative height describes the deformation of the side face and is determined from the quotient of the side contraction of a side face (peak-to-valley) to the width of the face. The relative depth of penetration is determined from the quotient of the depth of penetration H of the cooling elements (5) into the heating muffle (2) and the total height of the heating muffle. It can be seen that the relative height decreases substantially linearly with increasing depth of penetration of the cooling elements (5) into the heating apparatus (2). The value at which the warp is 0 and the side face is planar can be determined by extrapolation (illustrated as a straight line) of the data.

Figure 7:
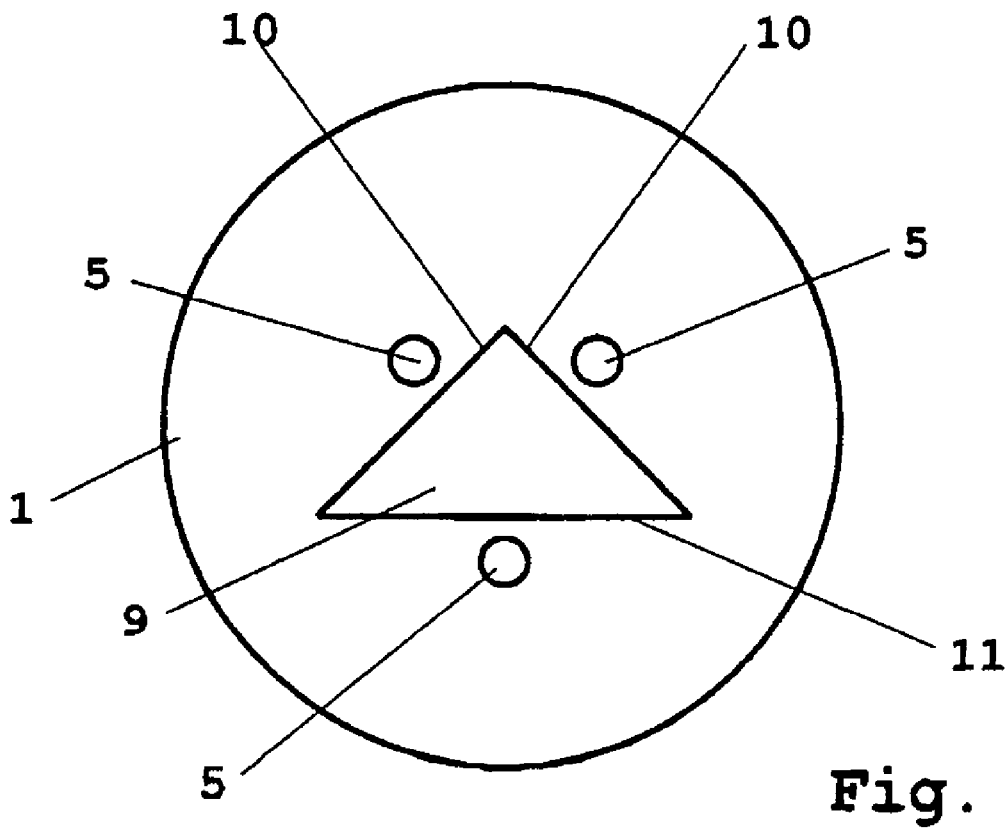
FIG. 7 shows, by way of example, a cross section or a sectional illustration through the apparatus shown in FIG. 1 on section line S1.

FIG. 7 shows a central cross section or a sectional illustration through the apparatus shown in FIG. 1 on section line S1 with an embodiment of the arrangement of cooling elements (5) according to the invention along the side faces of the glass strand (2), which has the cross section (6) of an isosceles prism.

A right-angled isosceles prism (9) made from N-BK7 with a lateral side length (10) of approx. 50 mm is used as preform (6) for a glass strand (2) for the production of this microprism, which can be used for optical pick-up systems. This preform is fed at a rate of approx. 10 mm/min to a heating muffle which has a diameter of approx. 150 mm. When producing prisms, the size ratio of heating muffle diameter to lateral side length (10) is advantageously over 2.5. Three cooling elements (5) are introduced into the heating muffle from above around the cross section of the glass strand (2), which is designed as a prism (9). The perpendicular distance from the glass is approx. 0.5 cm. A cooling element (5) is positioned in such a way that it lies in the center of the hypotenuse (11). The cooling elements (5) on the lateral sides (10) of the prism (9) are located at a distance of approximately ⅓ of the lateral side length (10) of the preform from the right angle. The heating muffle is heated to a temperature of approximately 740° C. The cooling fingers (5) are cooled using compressed air at room temperature with a flow rate of approx. 6 l/min. The precise flow rate is set by means of an automatic controller which receives the desired value from an optical measurement system which tests the flatness of the individual sides (10, 11). The glass strand is drawn through a parallel gripper at a rate of approx. 1560 mm/min and in the process cut to length of 70 mm. The prisms obtained in this way have a lateral side length of 4±0.1 mm, a roughness RMS of 2 nm, a flatness (PV) of less than 0.1 μm and an accuracy of the angles formed by the edges of better than 30".

It will be clear to the person skilled in the art that the embodiments described above are to be understood as examples. The invention is not restricted to these embodiments, but rather can be varied in numerous ways without departing from the scope of the invention.

LIST OF DESIGNATIONS

1 Heating apparatus
2 Glass strand
3 Feed direction
4 Drawing direction
5 Cooling or heating element
6 preform or cross-sectional geometry of a glass strand
7 Side face of a triangular prism
8 Side face of a rectangular prism
9 Right-angled isosceles prism
10 Lateral side of an isosceles prism
11 Hypotenuse of an isosceles prism
S1 Section line on the transverse axis in the heating apparatus

The invention claimed is:

1. A method for producing optical glass elements, comprising the steps of:
   providing a glass strand of a selected preform, feeding the glass strand into a heating apparatus, softening the glass strand in the heating apparatus,
   drawing the glass strand through a drawing apparatus to form the optical glass elements,
   controlling the geometry of the optical glass elements by cooling elements positioned at least around parts of a periphery and/or a longitudinal axis of the glass strand, inside the heating apparatus, wherein the cooling elements are provided as substantially hollow bodies and wherein the cooling elements are introduced completely and/or partially into the heating apparatus from an opening in which the glass strand is supplied and/or from an opening in which the optical glass elements are drawn out, and
   passing a fluid through the hollow bodies such that no fluid flow is directed onto the surface of the glass strand.

2. The method as claimed in claim 1, wherein the cooling elements are not in physical contact with the glass strand and/or do not come into physical contact with the glass strand.

3. The method as claimed in claim 1, wherein the cooling elements are arranged along at least one side face and/or along at least one corner of the glass strand.

4. The method as claimed in claim 1, wherein the cooling elements are arranged parallel and/or inclined with respect to a longitudinal axis of the glass strand.

5. The method as claimed in claim 1, wherein the cooling elements are positioned at a distance of from 0 cm to 50 cm from a surface of the glass strand fed to the heating apparatus and/or a surface of the glass strand in the heating apparatus and/or a surface of the optical glass elements.

6. The method as claimed in claim 1, wherein the cooling elements are introduced, arranged and/or positioned as a unit or independently of one another.

7. The method as claimed in claim 1, wherein the hollow bodies each have a diameter of from 0.1 cm to 30 cm and a length of from 0.5 cm to 100 cm.

8. The method as claimed in claim 1, wherein the fluid is passed through the hollow bodies at a flow rate of from 0.01 l/min to 1000 l/min.

9. The method as claimed in claim 8, wherein the flow rate of the fluid in each cooling element is set uniformly or independently.

10. The method as claimed in claim 1, wherein passing the fluid through the hollow bodies causes the hollow bodies to be cooled to a temperature difference of from 0° C. to 2500° C. with respect to a heating muffle.

11. The method as claimed in claim 1, wherein the heating apparatus softens the glass strand to a viscosity of from $10^4$ dPas to $10^{12}$ dPas.

12. The method as claimed in claim 1, wherein the glass strand fed to the heating apparatus has a cross-sectional area that is reduced by a factor of from ½ to 1/100000 by the drawing of the glass strand.

13. The method as claimed in claim 1, wherein the selected preform has a cross section provided in a shape that deviates from or is identical to a cross section of a final shape of the optical glass elements.

14. The method as claimed in claim 1, wherein the glass strand has at least one side face that is substantially concave, when the glass strand is seen in cross section, wherein the at least one side face is converted into a substantially planar side face and/or into a substantially convex shape of the optical glass elements.

15. The method as claimed in claim 1, wherein the glass strand has at least one side face that is substantially planar, when the glass strand is seen in cross section, wherein the at least one side face is converted into a substantially concave side face and/or into a substantially convex shape of the optical glass elements.

16. The method as claimed in claim 1, wherein the glass strand has at least one side face that is substantially convex, when the glass strand is seen in cross section, wherein the at least one side face is converted into a substantially planar side face and/or into a substantially concave shape of the optical glass elements.

17. The method as claimed in claim 1, wherein the glass strand has at least one side face that is substantially circular, when the glass strand is seen in cross section, wherein the at least one side face is converted into a substantially non-circular shape of the optical glass elements.

18. The method as claimed in claim 1, wherein the glass strand has at least one side face that is substantially non-circular, when the glass strand is seen in cross section, wherein the at least one side face is converted into a substantially circular shape of the optical glass elements.

19. A method for producing optical glass elements, comprising the steps of:
    providing a glass strand of a selected preform, wherein the glass strand has at least one side face that is substantially concave, when the glass strand is seen in cross section,
    feeding the glass strand into a heating apparatus,
    softening the glass strand in the heating apparatus,
    drawing the glass strand through a drawing apparatus to form the optical glass elements,
    controlling the geometry of the optical glass elements by cooling elements positioned at least around parts of a periphery and/or a longitudinal axis of the glass strand, inside and/or outside the heating apparatus, wherein the cooling elements are provided as substantially hollow bodies, and
    passing a fluid through the hollow bodies such that no fluid flow is directed onto the surface of the glass strand, wherein the at least one side face is converted into a substantially planar side face and/or into a substantially convex shape of the optical glass elements.

20. A method for producing optical glass elements, comprising the steps of:
    providing a glass strand of a selected perform, wherein the glass strand has at least one side face that is substantially planar, when the glass strand is seen in cross section,
    feeding the glass strand into a heating apparatus,
    softening the glass strand in the heating apparatus,
    drawing the glass strand through a drawing apparatus to form the optical glass elements,
    controlling the geometry of the optical glass elements by cooling elements positioned at least around parts of a periphery and/or a longitudinal axis of the glass strand, inside and/or outside the heating apparatus, wherein the cooling elements are provided as substantially hollow bodies, and
    passing a fluid through the hollow bodies such that no fluid flow is directed onto the surface of the glass strand, wherein the at least one side face is converted into a substantially concave side face and/or into a substantially convex shape of the optical glass elements.

21. A method for producing optical glass elements, comprising the steps of:
    providing a glass strand of a selected preform, wherein the glass strand has at least one side face that is substantially convex, when the glass strand is seen in cross section,
    feeding the glass strand into a heating apparatus,
    softening the glass strand in the heating apparatus,
    drawing the glass strand through a drawing apparatus to form the optical glass elements,
    controlling the geometry of the optical glass elements by cooling elements positioned at least around parts of a periphery and/or a longitudinal axis of the glass strand, inside and/or outside the heating apparatus, wherein the cooling elements are provided as substantially hollow bodies, and
    passing a fluid through the hollow bodies such that no fluid flow is directed onto the surface of the glass strand, wherein the at least one side face is converted into a substantially planar side face and/or into a substantially concave shape of the optical glass elements.

* * * * *